(12) United States Patent
Roach et al.

(10) Patent No.: US 6,900,415 B1
(45) Date of Patent: May 31, 2005

(54) ELECTRIC FRYER

(76) Inventors: Chris Roach, 591 Meghan Dr., Opelousas, LA (US) 70570; So Mo Wai Nicky, Unit 1006, 10-F, Carnarvon Plaza, 20 Carnarvon Road, Tsimshatsui, Kowloon (HK)

( * ) Notice: Subject to any disclaimer, the term of this patent is extended or adjusted under 35 U.S.C. 154(b) by 0 days.

(21) Appl. No.: 10/619,695

(22) Filed: Jul. 15, 2003

(51) Int. Cl.[7] .............................................. F27D 11/00
(52) U.S. Cl. ........................................ 219/433; 392/448
(58) Field of Search ................................ 219/433, 434, 219/435–6; 392/459, 448

(56) References Cited

U.S. PATENT DOCUMENTS

| | | | |
|---|---|---|---|
| 1,117,277 A | * 11/1914 | Supplee | 392/448 |
| 2,576,688 A | * 11/1951 | Landgraf | 392/498 |
| 2,769,878 A | * 11/1956 | Krichton | 337/384 |
| 3,234,905 A | * 2/1966 | Olson | 119/265 |
| 3,737,621 A | * 6/1973 | Elkins | 392/498 |
| 3,842,725 A | 10/1974 | Sano et al. | |
| 4,468,556 A | 8/1984 | Cunningham et al. | |
| 5,771,781 A | 6/1998 | Sham | |
| 5,931,081 A | 8/1999 | Sham et al. | |
| 6,365,878 B1 | 4/2002 | Lau et al. | |

* cited by examiner

Primary Examiner—Thor S. Campbell
(74) Attorney, Agent, or Firm—Kenneth L. Tolar

(57) ABSTRACT

An electric cooking apparatus for easily converting a pot to a deep fryer or boiler includes a housing having an elongated heating element attached thereto. The heating element includes an upper portion with a cover mounted thereon. An adjustable bracket secures the device to the upper rim of the pot. A safety switch enables the heating element only when the device is properly mounted. The position of the heating element may be adjusted so that the device can be easily used with various sized pots.

7 Claims, 4 Drawing Sheets

ELECTRIC FRYER

BACKGROUND OF THE INVENTION

The present invention relates to an electrical cooking device for quickly and conveniently converting a pot to a deep fryer or boiler.

DESCRIPTION OF THE PRIOR ART

Many food items such as turkey, crawfish, fish, lobsters and shrimp are deep fried or boiled in an outdoor cooker using a voluminous, stainless steel pot. Gas fueled burners are the most common heating source for the cooker. However, gas fueled burners are inherently dangerous and often cause fires or explosions. Furthermore, the fuel gas is stored in small cylinders or bottles that must be frequently refilled.

Conventional outdoor boilers or deep fryers include multiple interrelated components including a burner and corresponding pot. Accordingly, the burner is typically only usable with a particular style and/or size pot thereby greatly limiting its versatility. The present invention addresses the problems associated with conventional outdoor cookers by providing a uniquely configured heating element that is attachable to a pot allowing the pot to be easily converted to a deep fryer or boiler.

Various electric fryers and similar cookers exist in the prior art. For example, U.S. Pat. No. 6,365,878 issued to Lau et al. discloses an electric cooking apparatus including a basket having a securing means for preventing movement relative to a housing.

U.S. Pat. No. 5,931,081 issued to Sham et al. discloses an electrical deep fryer having means for automatically immersing and removing a frying basket into and out of cooking oil to assure uniform frying.

U.S. Pat. No. 5,771,781 issued to Sham discloses an electrical deep fryer substantially similar to that disclosed in '081 issued to Sham, supra.

U.S. Pat. No. 3,842,725 issued to Sano et al. discloses an electric fryer that utilizes a stream of running water for absorbing fumes from food and cooking oil.

U.S. Pat. No. 4,468,556 issued to Cunningham et al. discloses an electric fryer including a housing that removably receives a cooking tank. A heating element extends into the tank so as to be submerged in cooking oil when the device is in use.

As indicated above, numerous electric fryers exist in the prior art. However, none of the above mentioned patents disclose or suggest an elongated heating element having a uniquely configured attachment means for securing the heating element to the upper rim of any one of varying sized pots thereby converting it to a deep fryer or boiler.

SUMMARY OF THE INVENTION

The present invention relates to an electric cooking apparatus for use with a pot to convert the pot to a fryer or boiler. The pot typically includes a lower surface and a cylindrical outer wall vertically extending therefrom. The outer wall terminates at an upper rim that defines an opening in communication with a cooking chamber. The opening is selectively enclosable with a lid.

The electric cooking apparatus includes an electronics housing having a front face, a rear face, a top edge and a bottom edge. On the front face is a temperature selection dial and activation switch for controlling internal circuitry associated with a heating element. The heating element extends from the top surface of the housing and includes an upper U-shaped portion with a pair of vertical portions depending therefrom. Integrally extending from a lower end of each vertical portion is a horizontal portion. The heating element has sufficient length to position the horizontal portion to a position immediately above the bottom of the pot. Accordingly, the length of the vertical portions can be varied to fit a particular sized pot.

Superimposed on the upper U-shaped portion of the heating element is a cover having a pair of opposing slots thereon for accommodating the pot upper rim. Attached to the rear face of the housing and positioned within the cover is an adjustable spacing bracket for selectively positioning the heating element at a predetermined depth within the cooking chamber.

The heating element is activated with a safety switch mechanism including a lever having a lower end hingedly attached to the housing rear face. The lever includes an upper portion that engages the upper rim of the pot when the device is properly mounted thereon. A spring-biased actuator electrically connected to the heating element extends from the housing and is positioned adjacent the lever. Accordingly, when the device is properly mounted on the pot rim, the lever will pivot backwardly to engage the actuator allowing the heating element to be safely energized. The electric cooking apparatus may also include a lid having a slot on a peripheral edge thereof that is dimensioned and configured to receive the heating element cover. The slotted lid allows a user to enclose the cooking chamber when boiling without interference from the cover.

It is therefore an object of the present invention to provide an electric cooking apparatus that allows a user to easily convert a conventional pot to an electric deep fryer or boiler.

It is another object of the present invention to provide an electric cooking apparatus having a safety switch means for allowing the burner to only be operated when the device is properly mounted on a pot.

It is yet another object of the present invention to provide an electric cooking apparatus that eliminates the hazards associated with gas fueled burners. Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
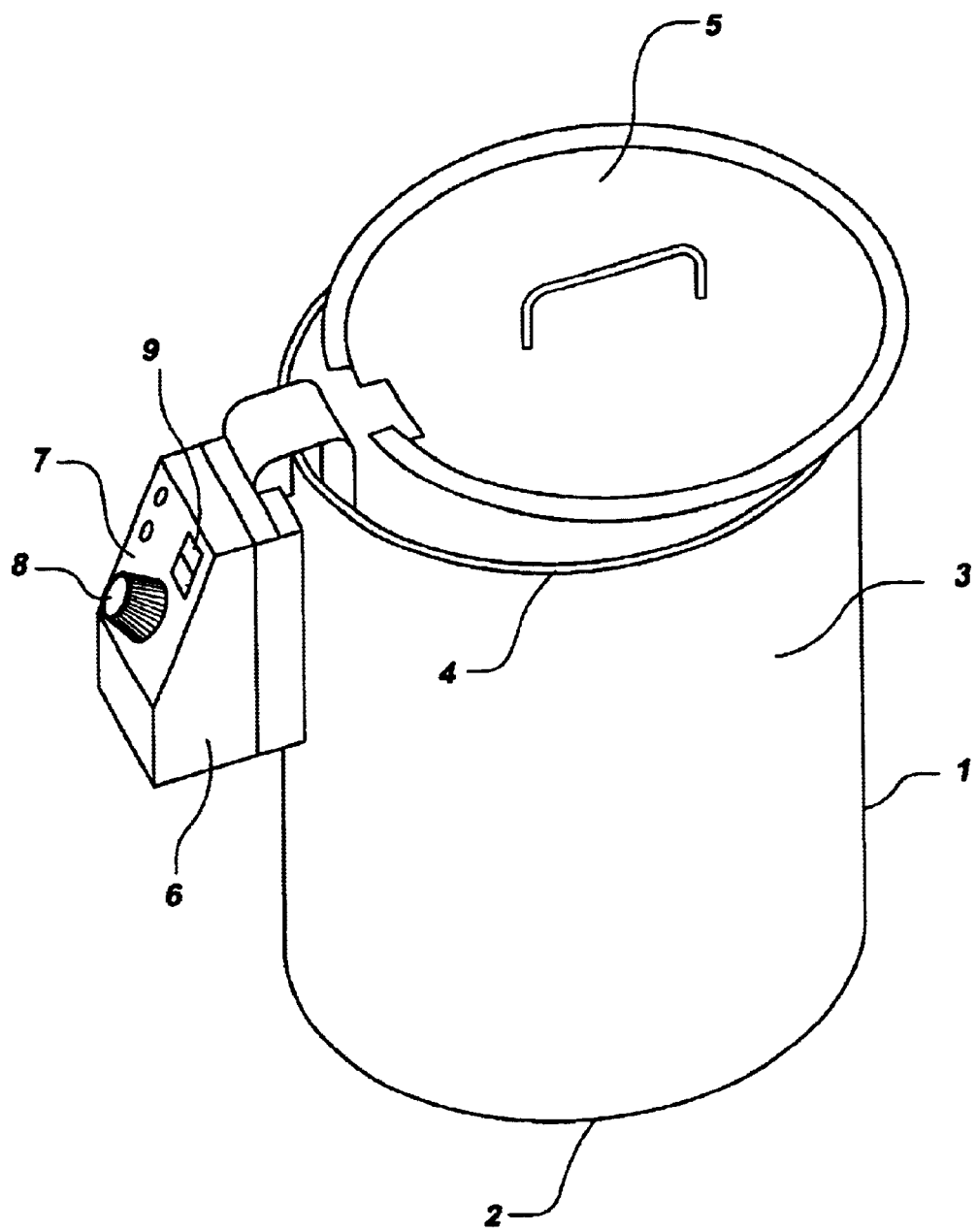
FIG. 1 is a perspective view of the device mounted on a pot.
Figure 2:
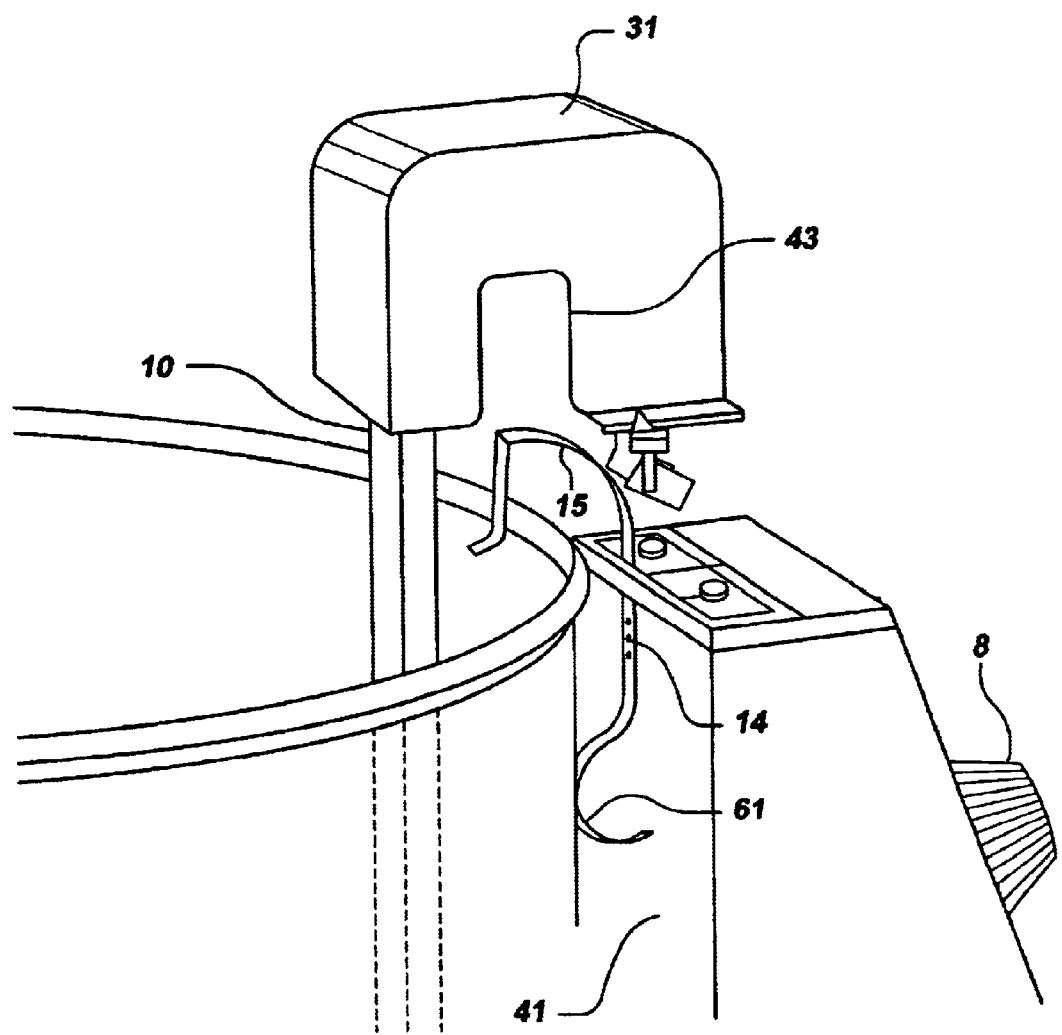
FIG. 2 is a partial, slightly exploded view of the device mounted on a pot.
Figure 3:
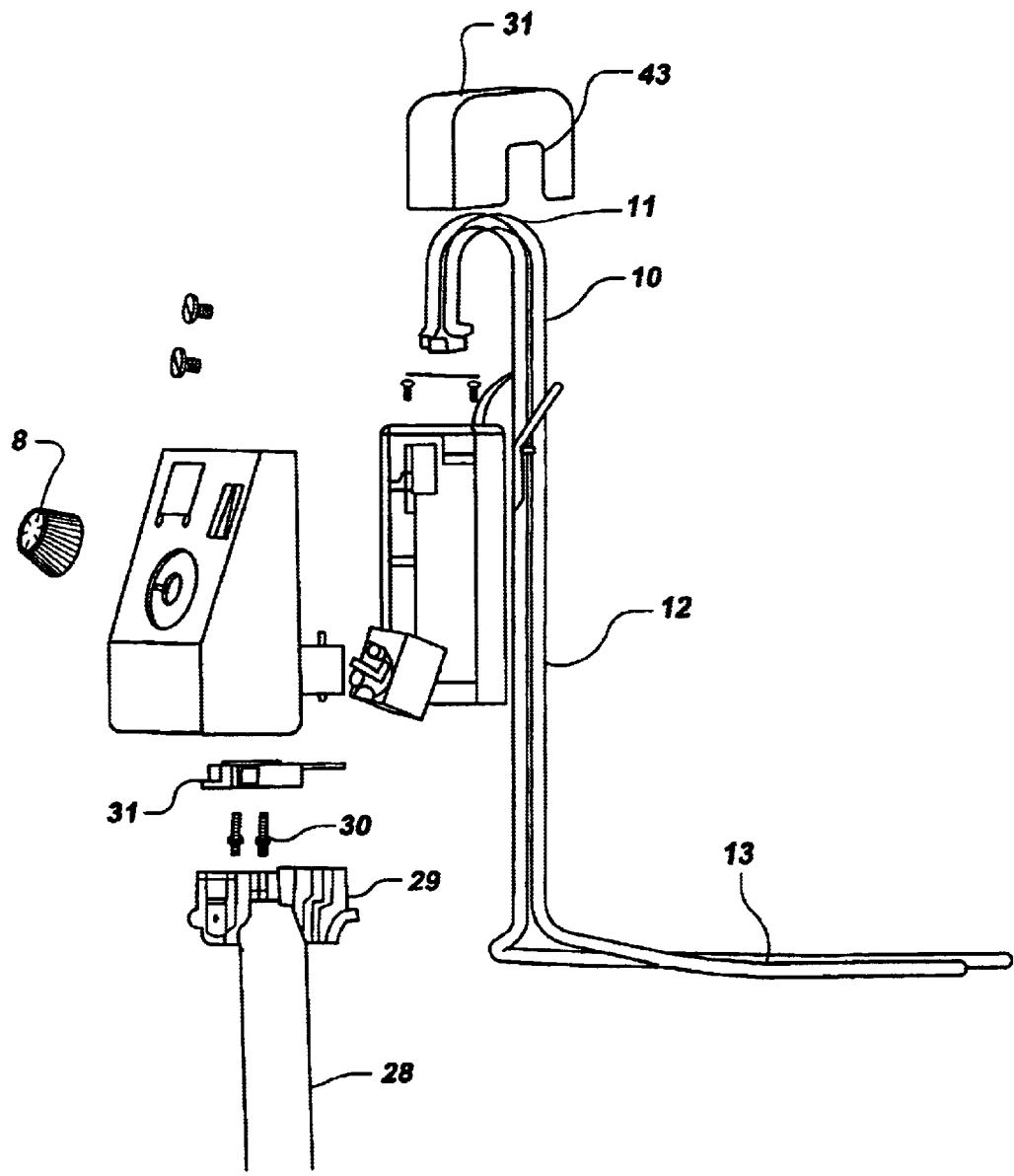
FIG. 3 is an exploded view of the device.
Figure 4:
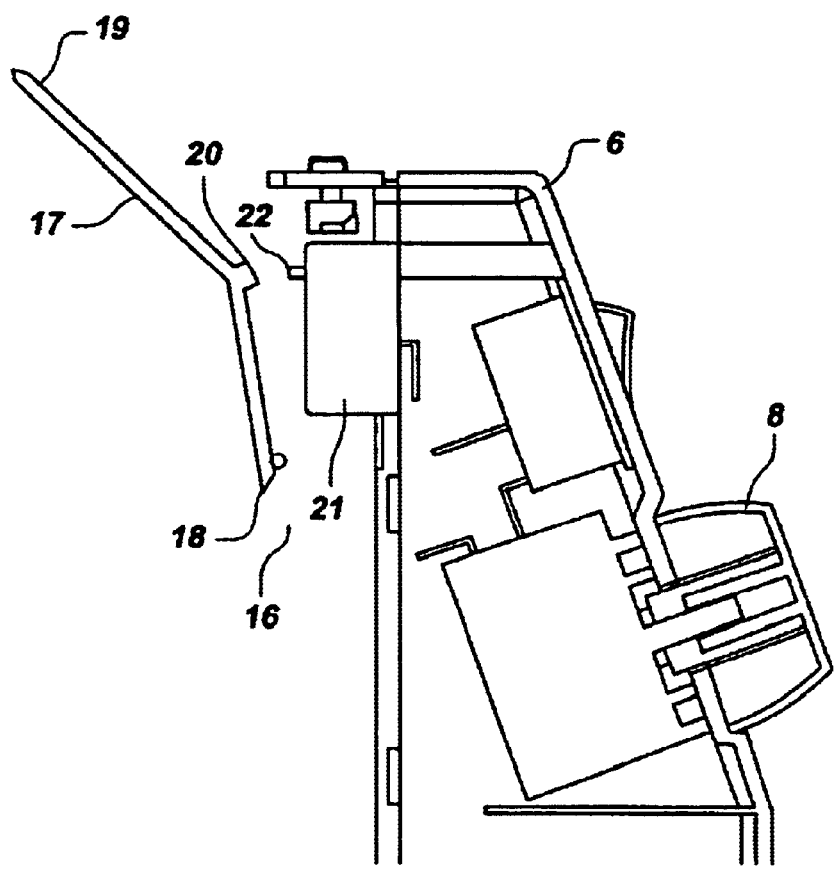
FIG. 4 is a detailed view of the safety switch mechanism.

The present invention relates to an electric cooking apparatus for use with a fry or boiling pot 1 to convert it to a portable deep fryer or boiler. The pot typically includes a lower surface 2 and a cylindrical outer wall 3 vertically extending therefrom. The outer wall terminates at an upper rim 4 that defines a top opening in communication with an interior cooking chamber. The opening is selectively enclosable with a lid 5.

The electric cooking apparatus includes an electronics housing 6 having a front face 7, a rear face 41, a top edge and a bottom edge. On the front face is a temperature selection dial 8 and activation switch 9 for controlling internal circuitry such as a thermostat. Extending from the top surface of the housing is a unitary heating element 10 having a downwardly turned, U-shaped upper portion 11 with a pair of vertical portions 12 depending therefrom. Integrally extending from a lower end of each vertical portion is a horizontal portion 13. The heating element has sufficient length to extend the horizontal portion to a position immediately above the bottom of the pot. Accordingly, the length of the vertical portions can be varied so as to be suitable with virtually any sized pots. In addition, a protective panel may be included for overlaying the horizontal portion to prevent food and residue from contacting the heating element.

Superimposed on the upper U-shaped portion of the heating element is a cover 31 having a pair of opposing slots 43 thereon for accommodating the pot upper rim. Attached to the rear face of the housing and positioned within the cover is an adjustable spacing bracket 15 that rests on the upper rim of the pot that allows the depth of the heating element to be adjusted. The bracket includes a plurality of apertures 14 for receiving a screw or similar fastener to selectively reposition the bracket relative to the housing. The bracket also includes a protruding portion 61 that abuts the pot outer wall thereby preventing the housing from engaging the pot and overheating.

The heating element is activated with a safety switch mechanism 16 including a lever 17 having a lower end 18 hingedly attached to the housing rear face. The lever includes an angularly extending upper portion 19 for engaging the pot rim and an engagement member 20 on an intermediate portion. Received within the housing is an activation switch 21 having a spring-biased actuator 22 extending through an opening on the housing rear face. The actuator is in communication with the heating element circuitry and, when in a normal position, interrupts power thereto. When the device is properly mounted on the upper rim of the pot, the lever is pivoted backwardly until the engagement member depresses the actuator thereby powering the heating element. Accordingly, the heating element cannot be inadvertently activated unless the device is properly mounted on the rim.

The electric cooking apparatus may also include a lid having a slot 26 on a peripheral edge thereof that is dimensioned and configured to receive the heating element cover. The slotted lid allows the cooking chamber to be completely enclosed when boiling without interference from the cover.

The heating element and associated circuitry are powered with an electrical cord 28 having a magnetic connection for enhanced safety. The cord includes a plug member 29 having a metallic portion 30 that is magnetically secured to a magnet within an electrical socket 31. The cord detaches from the housing upon application of a predetermined amount of force, such as if someone trips over the cord, to disable the heating element.

The device is not limited to the exact details of construction and enumeration of parts shown and described. For example, the size and configuration of the heating element can be varied so as to be suitable with virtually a pot of any size or shape. Furthermore, the size, shape and materials of construction of the various components can be varied to suit a particular application.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a pot having a bottom surface with a cylindrical outer wall extending therefrom, the cylindrical wall having an upper rim, an electric cooking apparatus comprising:

a housing;

a heating element attached to said housing;

means for removably securing said housing to the upper rim of said pot;

an adjustable bracket attached to said housing for suspending the lower portion of said heating element at a predetermined depth within said pot.

2. The apparatus according to claim 1 further comprising:

a safety switch means for selectively activating said heating element whenever said heating element is mounted to said pot upper rim.

3. The apparatus according to claim 1 wherein said safety switch means comprises:

a lever hingedly attached to said housing, said lever having an engagement member thereon;

a spring-biased actuator mounted on said housing and electrically connected to said heater, said actuator in a first position when said housing is detached from said pot to disable said heating element, said lever pivoting when said housing is mounted on said pot to thrust said engagement member against said actuator thereby displacing said actuator to a second position to enable said heating element.

4. The apparatus according to claim 1 further comprising a cover superimposed on said heating element, said cover having a pair of opposing slots for receiving the upper rim of said pot.

5. The apparatus according to claim 1 further comprising:

an electrical connector on said housing, said connector electrically connected to said heating element;

an electrical cord magnetically attachable to said connector for selectively powering said heating element.

6. The apparatus according to claim 1 further comprising a lid, said lid positioned on the upper rim of said pot, said lid having a peripheral edge with a notch formed thereon, said notch dimensioned and configured to receive and substantially conform to said cover.

7. The apparatus according to claim 1 wherein said heating element includes an upper portion, a vertical portion depending from said upper portion, and a horizontal portion extending from said vertical position.

* * * * *